(12) United States Patent
He et al.

(10) Patent No.: US 6,250,551 B1
(45) Date of Patent: Jun. 26, 2001

(54) AUTODISCRIMINATION AND LINE DRAWING TECHNIQUES FOR CODE READERS

(75) Inventors: Duanfeng He, Farmingville; Eugene Joseph, Coram; Joseph Cai, Holbrook, all of NY (US)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

(21) Appl. No.: 09/096,348

(22) Filed: Jun. 12, 1998

(51) Int. Cl.⁷ .............................. G06K 7/10; G08C 21/00
(52) U.S. Cl. ............... 235/462.07; 235/454; 235/462.25
(58) Field of Search .............................. 235/454, 462.01, 235/462.07, 462.08, 462.09, 462.1, 462.11, 462.25, 462.28, 494; 382/192

(56) References Cited

U.S. PATENT DOCUMENTS

| | | |
|---|---|---|
| 4,251,798 | 2/1981 | Swartz et al. ...................... 235/462.2 |
| 5,268,580 | 12/1993 | He ...................................... 235/462.1 |
| 5,428,211 * | 6/1995 | Zheng et al. ................. 235/462.08 X |
| 5,457,309 * | 10/1995 | Pelton .............................. 235/462.28 |
| 5,459,310 | 10/1995 | He et al. .............................. 250/205 |
| 5,468,946 * | 11/1995 | Oliver ............................. 235/462.07 |
| 5,504,319 * | 4/1996 | Li et al. ........................... 235/462.08 |
| 5,521,368 * | 5/1996 | Adachi ............................ 235/462.08 |
| 5,525,788 * | 6/1996 | Bridgelall et al. ............... 235/462.08 |
| 5,561,283 | 10/1996 | Dvorkis et al. .................. 235/462.09 |
| 5,635,697 | 6/1997 | Shellhammer et al. ......... 235/462.11 |
| 5,637,849 | 6/1997 | Wang et al. .......................... 235/454 |
| 5,739,518 * | 4/1998 | Wang .............................. 235/462.09 |
| 5,867,594 | 2/1999 | Cymbalski ........................... 382/192 |
| 5,867,595 | 2/1999 | Cymbalski ........................... 382/192 |
| 5,917,945 * | 6/1999 | Cymbalski ........................... 382/192 |
| 5,969,325 * | 10/1999 | Hecht et al. ................. 235/426.25 X |
| 5,988,505 * | 11/1999 | Shellhammer .................. 235/462.09 |

FOREIGN PATENT DOCUMENTS

| | | |
|---|---|---|
| 0164012A1 | 12/1985 | (EP) . |
| 0 484 935 A2 * | 5/1992 | (EP) . |

OTHER PUBLICATIONS

Publication IR–2000 Features & Specifications Metanetics Corporation, Met02–002 12/96.
ImageTeam® 4400 Series, Welch Allyn, ISL 391 Rev. E, 6/97.
Newman et al., *Principles Of Interactive Computer Graphics*, pp. 20–27 (McGraw Hill 2d Ed.) (No date available).

* cited by examiner

*Primary Examiner*—Michael G. Lee
*Assistant Examiner*—Jared J. Fureman
(74) *Attorney, Agent, or Firm*—Burns, Doane, Swecker & Mathis, L.L.P.

(57) ABSTRACT

The disclosure relates to optical image readers having a two-dimensional image sensor and an auto-discrimination function. The auto-discrimination function identifies optical codes by type for pixel clusters and, in some cases, tilt angle and start/stop coordinates. The clustered pixel data is passed to an appropriate decoder identified by the auto-discrimination function based upon a likelihood that the cluster contains an optical code of a particular type. Line drawing techniques provide for adequate sampling of the clustered pixel data code based on the tilt angle of the code relative to a image sensor array.

34 Claims, 12 Drawing Sheets

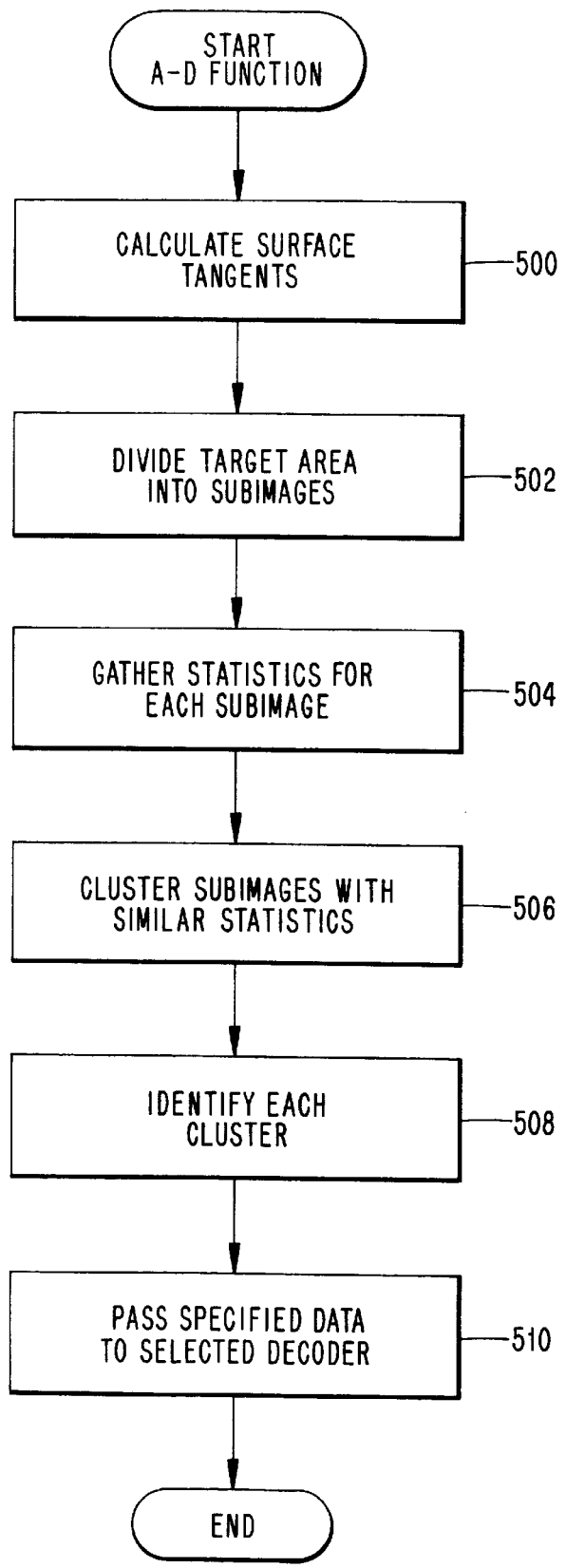

AUTODISCRIMINATION AND LINE DRAWING TECHNIQUES FOR CODE READERS

FIELD OF THE INVENTION

The invention relates to imaging, image categorization and image processing in optical code reading devices. Aspects of the invention are particularly useful in image-based, handheld code readers which are positioned at variable orientations and distances with respect to a target code.

BACKGROUND OF THE INVENTION AND OBJECTS

Optical codes are patterns made up of image areas having different light reflective or light emissive properties, which are typically assembled in accordance with a priori rules. The term "bar code" is sometimes used to describe certain kinds of optical codes. The optical properties and patterns of optical codes are selected to distinguish them in appearance from the background environments in which they are used. Devices for identifing or extracting data from optical codes are sometimes referred to as "optical code" readers, of which bar code scanners are one type.

Optical code readers are used in both fixed or portable installations in many diverse environments such as in stores for check-out services, in manufacturing locations for work flow and inventory control and in transport vehicles for tracking package handling. The optical code can be used as a rapid, generalized means of data entry, for example, by reading a target code from a printed listing of many codes. In some uses, the optical code reader is connected to a portable data processing device or a data collection and transmission device. Frequently, the optical code reader includes a handheld sensor which is manually directed at a target code.

Most conventional optical scanning systems are designed to read one-dimensional bar code symbols, such as the ubiquitous UPC code. Typically, bar codes include a pattern of variable-width rectangular bars separated by fixed or variable width spaces. The bars and spaces have different light reflecting characteristics. One example of a one dimensional bar code is the UPC/EAN code used to identify, for example, product inventory. An example of a two-dimensional or stacked bar code is the PDF417 bar code. A description of PDF417 bar code and techniques for decoding it are disclosed in U.S. Pat. No. 5,635,697 to Shellhammer et al and assigned to Symbol Technologies, Inc., which patent is incorporated herein by reference. Another conventional optical code is known as "MaxiCode". It consists of a central finder pattern or bull's eye center and a grid of hexagons surrounding the central finder. It should be noted that the aspects of the inventions disclosed in this patent application are applicable to optical code readers, in general, without regard to the particular type of code or codes which they are adapted to read. In fact, the present invention is specifically adapted to operate as an omnicode reader, i.e., able to read many different types of codes. The invention described may also be applicable to some associated image recognition or analysis.

Most conventional scanning systems generate one or more beams of laser light which reflects off a bar code symbol and back to the scanning system. The system obtains a continuous analog waveform corresponding to the light reflected by the code along one or more scan lines of the system. The system then decodes the waveform to extract information from the bar code. A system of this general type is disclosed, for example, in U.S. Pat. No. 4,251,798, assigned to Symbol Technologies, Inc. A beam scanning system for detecting and decoding one and two dimensional bar codes is disclosed in U.S. Pat. No. 5,561,283, also assigned to Symbol Technologies, Inc.

Bar codes can also be read employing imaging devices. For example an image sensor may be employed which has a two dimensional array of cells or photo sensors which correspond to image elements or pixels in a field of view of the device. Such an image sensor may be a two dimensional or area charge coupled device (CCD) and associated circuits for producing electrical signals corresponding to a two-dimensional array of pixel information for a field of view. The pixel information generated by the CCD can, after digitization, be stored in a memory device for subsequent image processing which is used to locate and decode the codes which have been electronically captured by the CCD.

U.S. Pat. No. 5,268,580 to Duanfeng He (one of the Applicants of the present invention) describes a known imaging device that is used to read bar codes. This patent describes a technique for evaluating the pixel information stored in the memory device to determine bar edges as part of the process of locating a bar code. However, the device described in the He patent is limited to use in reading one particular type of optical code, i.e., bar codes. As described above, today there are many different types of codes available, many of which may be unreadable using the imaging device described in the He patent.

Accordingly, it is an object of the present invention to provide apparatuses and methods which can be used to efficiently decode many different types of codes, preferably independently of user interaction, which types of devices and methods are referred to herein by the word "omnicode".

Some omnicode devices have already been designed to read different types of codes. These conventional omnicode readers may use an unsophisticated, trial and error approach to decipher the information provided in the scanned codes. For example, these devices may sample the image in one or more directions, e.g., by drawing lines across the image to identify dimensional values, and then attempt to decode the sampled information in a variety of ways until an intelligible pattern match is achieved. Thus, this approach might first evaluate a sample as a bar code, then as a two-dimensional PDF code, then as a MaxiCode, and so on until the code is successfully decoded. However, this approach is very processing power intensive and becomes more and more inefficient as the number of different types of codes increases.

Accordingly, it is another object of the invention to avoid trial and error approaches to decoding by identifying the code type before decoding.

As mentioned above, one of the tasks involved in reading an optical code involves sampling the code to determine dimensional values of the code elements. For example, a one-dimensional bar code can be decoded by determining the widths of the code elements (i.e, bars and/or spaces) and matching those values against predetermined patterns. In a conventional laser scanning device, the samples were taken directly by sweeping a beam across the code to obtain a sample line across all of the code elements. These samples could then be used to determine the needed dimensional values and decode the bar code. The scanning line of the device was visible to the user so that it could be properly directed depending upon the orientation of the bar code being scanned.

In imaging devices, however, information is obtained for a two dimensional area defined by the field of view of the device. One or more codes of the same or different types may be disposed in this area. The orientation of the code or codes may be arbitrary relative to the field of view. The field of view may also include environmental background and regions which are devoid of optical codes. The resultant digitized information is available in memory as, for example, gray scale pixel values and the image processing circuitry and/or software must determine which pixels values should be evaluated to read the optical code. This selection or sampling process is referred to herein as "line drawing", since it involves the selection of pixels relative to an ideal scanning line whose values are checked to determine code element dimensions.

Accordingly, it is another object of the invention to provide appropriate line drawing techniques to sample the pixel values in memory which take into account the arbitrary nature of the type of code being read and its orientation.

SUMMARY OF THE INVENTION

The present disclosure relates to methods and apparatus useful in optical code readers, especially imaging optical code readers. Techniques are disclosed which are applicable to the signal processing techniques that are used to transform the sensed optical patterns into the values associated with the optical code. Different types of optical codes (e.g., bar codes, two-dimensional codes, MaxiCodes, etc.) can all be decoded using techniques according to the present invention.

An imaging and aiming apparatus for an optical code reader may be based on an image sensor, including an array of photo sensor cells for producing electronic signals corresponding to a two-dimensional array of pixel information for a field of view. This pixel information is stored in a memory device, e.g., a random access memory (RAM) for subsequent image analysis processing. According to one exemplary embodiment, the pixel information is first evaluated by an auto-discrimination function which identifies each optical code in the field of view by its type and orientation. Depending upon the type of code identified by the auto-discrimination function, certain information is then passed to an appropriate decoding function to determine the values associated with the identified optical code.

According to one exemplary embodiment, surface tangent vectors are computed for all, or some, of the pixels, which tangents can also be stored in memory. These vectors provide information relating to the contours and orientations of the code elements. The surface tangent information can be processed in chunks referred to herein as subimages, for example, 32×32 pixel subimages. Within each subimage the surface tangent vectors can be analyzed to generate tangent statistics for that subimage. Then, subimages which have common tangent statistics can be grouped together to determine general boundaries associated with a cluster, i.e., a potential optical code.

The tangent statistics can also be used to identify the code type associated with a cluster. For example, if the tangent statistics for a cluster reveal one predominant orientation, then the code is most likely to be a one-dimensional code. Alternatively, if the tangent statistics reveal two major tangent vector orientations, then the code is most likely to be a two-dimensional code. Clusters having a greater distribution of tangent orientations can be classified as other types of codes, e.g, MaxiCodes.

Other types of statistics can be generated using the stored pixel data for use in identifying optical code types. For example, a black level, a white level and a threshold level can be computed for each subimage. These statistics can be used in conjunction with, or as opposed to, surface tangent statistics to discriminate between optical code types.

Once an optical code type has been identified by the auto-discrimination function, information is passed to an appropriate decoding function, which information can include a direction of orientation of the optical code, coordinates associated with a cluster, etc. The decoding function can use this information to sample pixel data in memory in order to obtain information for decoding. The selection of specific pixels as samples, referred to herein as line drawing, can be made in different ways depending upon the orientation of the code relative to the elements in the image sensing array.

BRIEF DESCRIPTION OF THE DRAWINGS

These and other features, objects and advantages of the present invention will be more readily understood by reading the following detailed description, including the ed drawings, wherein:

FIG. 5 is a flow chart illustrating one technique for auto-discrimination of optical code types using surface tangent vectors according to an exemplary embodiment of the present invention;

DETAILED DESCRIPTION OF THE DRAWINGS AND PREFERRED EMBODIMENTS

The following exemplary embodiments are provided in the context of a specific, yet purely illustrative, optical code reading device. However, those skilled in the art will appreciate that the inventive image processing techniques and structures described herein, e.g., for discriminating between code types and line drawing, can also be used in other devices, Moreover, some details associated with the exemplary optical code reading device described below with respect to FIGS. 1 and 2, have been omitted so as not to obscure the present invention. However, the interested reader can obtain more information regarding this exemplary optical code reading device by reviewing U.S. Pat. application Ser. No. 09/096,587 entitled "Imaging Engine and Method for Code Readers" to Correa et al., and filed on the same date as this application, the disclosure of which is expressly incorporated here by reference.

Optical Code Reader

Figure 1:
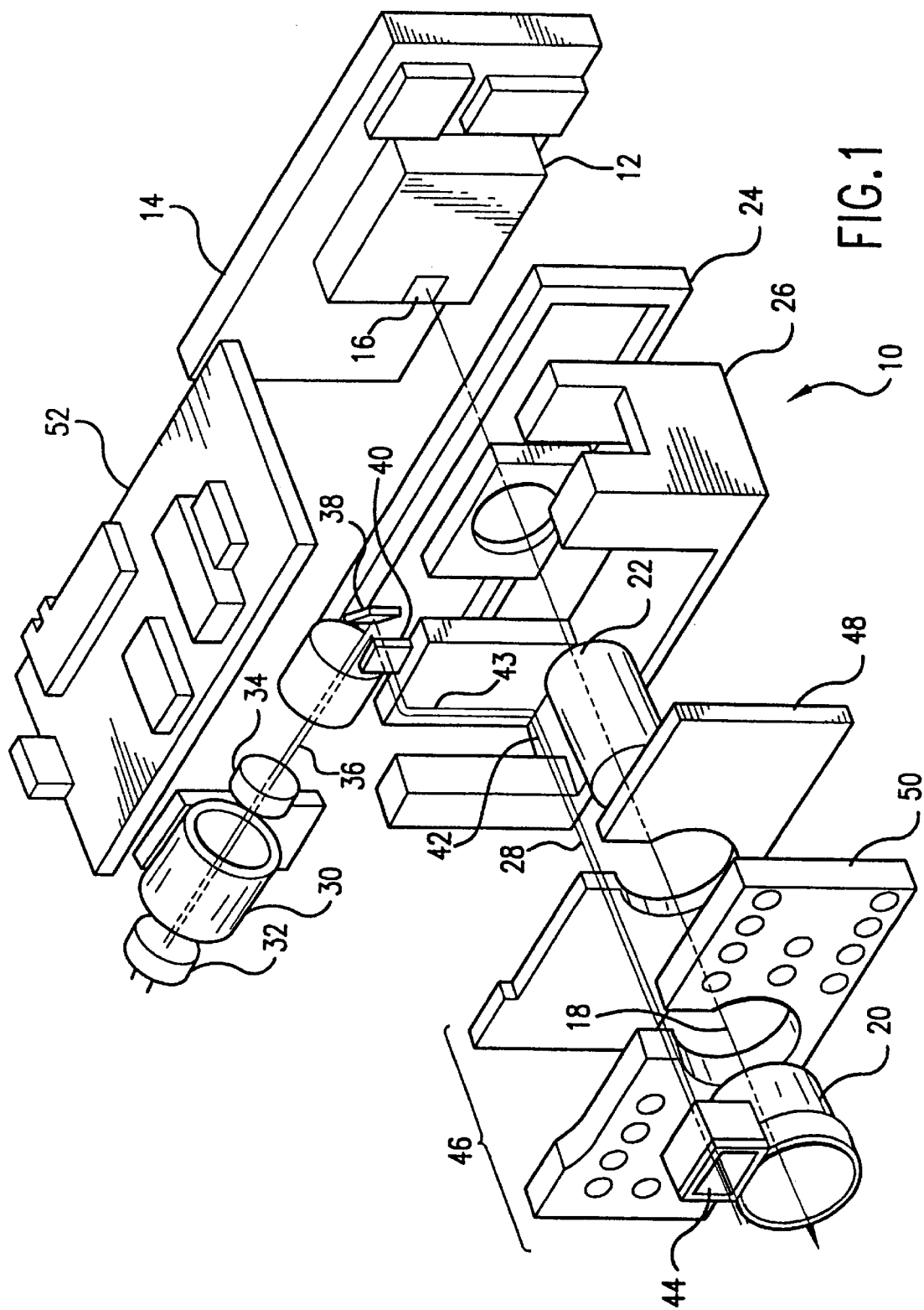
FIG. 1 is an exploded view of an exemplary imaging engine in which the present invention can be implemented.

FIG. 1 is an exploded view illustrating certain optical paths and subsystems of the exemplary imaging engine. As shown, the imaging engine includes various circuit boards, optical elements and chassis elements. A packaged image sensor 12 is located on an image sensor board 14. The image sensor board 14 may also contain image acquisition circuitry associated with the image sensor 12. In a preferred embodiment, the image sensor 12 is an area CCD having a window 16 through which an incident image is received. The CCD converts the incident light into electrical signals which are processed in a manner indicated below.

A line 18 indicates the principal optical axis of the image sensor 12 of the imaging engine 10. The principal optical axis 18 passes through an optical baffle 20 into an objective lens assembly 22 having the same principal optical axis as the system as a whole. The optical axis 18 then passes to the window 16 of the CCD package 12.

In operation, a field of view of the imaging engine is imaged by the image sensor 12. More particularly, light from the field of view passes through the optical baffle 20 and into the lens assembly 22 which focuses the light on the surface of the CCD in the CCD package 12. An array of photo sensor cells in the CCD produce electronic signals corresponding to a two dimensional array of pixel information for a target image. For example, the imaging engine of FIG. 1 can employ a high sensitivity CCD array having a resolution of 659×494 pixels.

The image sensor board 14 carrying the CCD sensor 12 and the lens assembly 22 are mounted on chassis member 24. A second chassis member 26, together with the first chassis member, forms a rigid body for the imaging engine.

The imaging engine 10 is provided with an aiming system which will be described in connection with an optical path 28. Light for the aiming system is provided by an aiming beam generator assembly 30 which includes a laser diode 32 and a torroidal lens 34. An aiming laser beam 36 emanates from the generator assembly and is reflected by a folding mirror 38 through a diffractive optical element 40. The diffractive element 40 creates diverging beamlets which follow a path indicated by the numeral 42 (the path 42 has been stretched in the y-axis direction as indicated by the broken lines 43 in order to facilitate the rendering of an exploded view in FIG. 1). The diverging beamlets from the aiming system exit the imaging engine through a front face of the imaging engine at a window 44 in the optical baffle element 20.

An illumination source 46 for the imaging engine 10 can be provided. An illumination printed circuit board 48 carries light emitting diodes. A lenslet plate 50 which forms the external front face of the imaging engine. Light from laser diodes on the illumination printed circuit board 48 passes through the lenslet plate 50 and provides an illumination field for the imaging engine. Power for the illumination printed circuit board is provided from the power supply board 52. Power for the other electronic components of the imaging engine including the image sensor board may also be provided by the power supply board 52.

Figure 2:
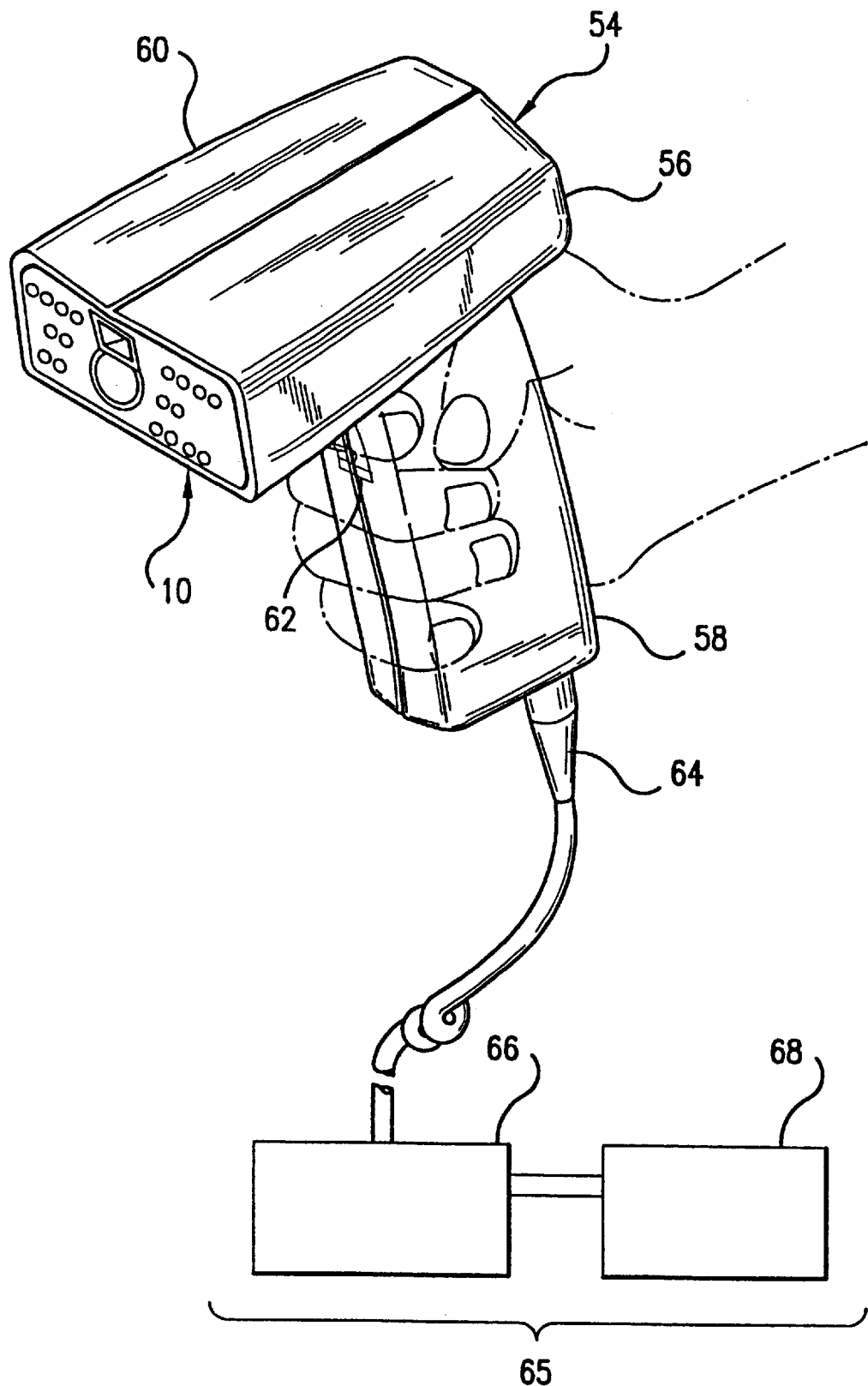
FIG. 2 is a pictorial view of an exemplary handheld optical code reader incorporating the imaging engine of FIG. 1.

FIG. 2 is a pictorial view of a handheld optical code reader incorporating the imaging engine of FIG. 1. The handheld code reader 54 of FIG. 2 includes a housing 56 having a generally elongated handle or hand grip 58 and an upper portion 60 for housing the imaging engine 10. The front face of the imaging engine appears at the forward end of the upper portion of the handheld optical code reader 54.

A manually actuatable trigger 62 is mounted in moving relationship on the handle portion 58 in a forward facing region of the optical code reader. The user's forefinger is normally used to actuate the optical code reader by depressing the trigger. A flexible electrical cable 64 may be provided to connect the optical code reader to components of the code reading system. In alternative embodiments the cable may also provide electrical power to the scanning engine 10. In preferred embodiments the cable 64 is connected to a host device or system 65 which receives decoded data from the optical code reader. In alternative embodiments a decode module 66 may be provided exterior to the optical code reading engine 10. In such an embodiment decoded data from the decode module 66 may be transmitted to further host device processing equipment and terminals represented generally by the box at numeral 68.

Imaging engine electronic hardware includes two major electrical subsystems: an imaging subsystem and a decoding subsystem. The imaging subsystem includes an area CCD sensor, analog-to-digital converter, timing generator, automatic gain control (AGC) circuit and the peripheral circuits to control the above components. The decoding subsystem is constructed around a micro processor unit. In preferred embodiments the micro processor is an IBM manufactured Power PC (403 Series). The PowerPC is a 32 bit RISC embedded controller which provides high performance and functional integration with low power consumption. Other components of the decoding subsystem include a flash ROM, DRAM, I/O (8 bit bidirectional parallel port, 16 user/system single bit I/O's) and required glue logic.

Figure 3:
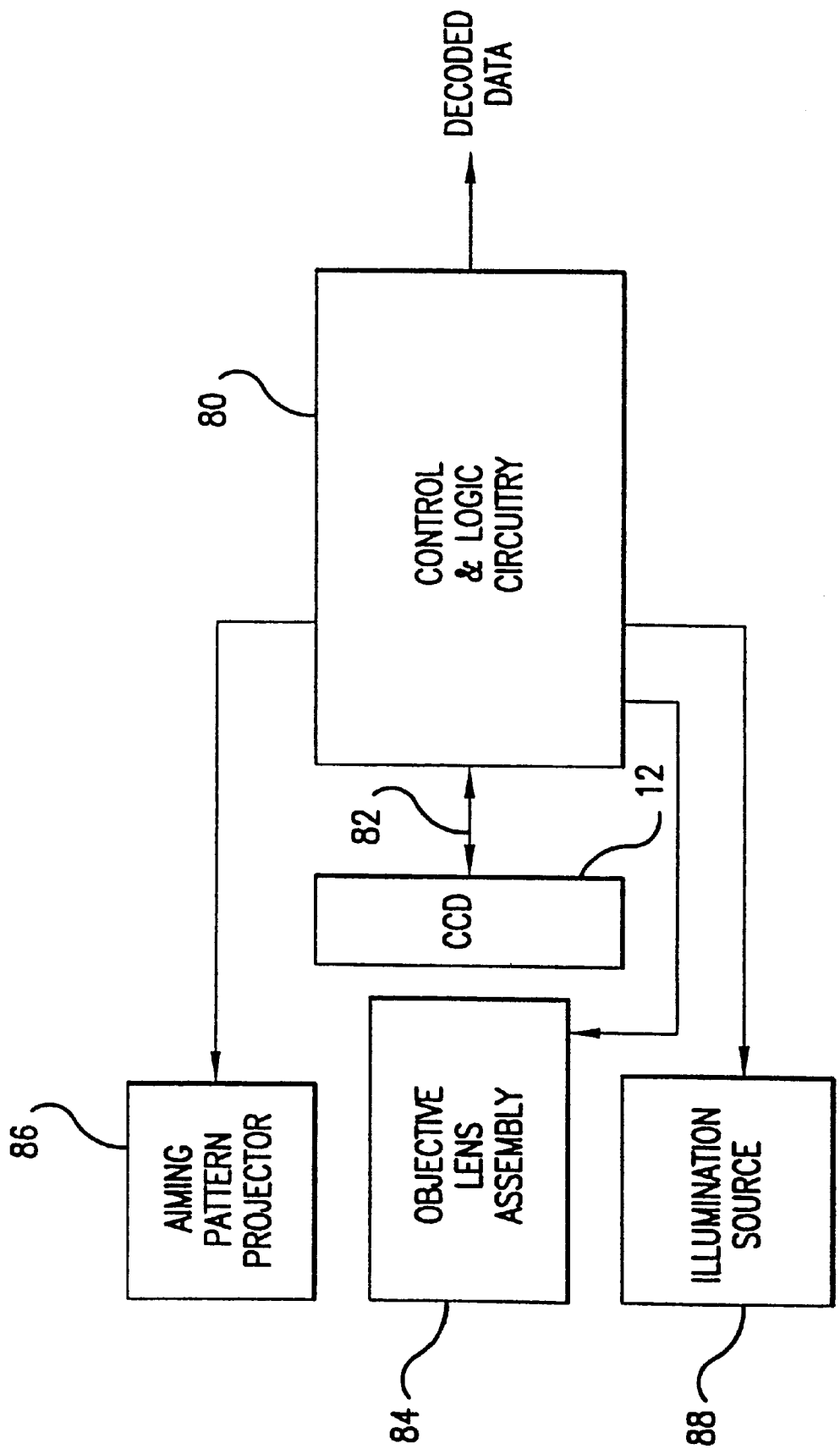
FIG. 3 is a simplified functional block diagram the imaging engine of FIG. 1.

FIG. 3 is a functional block diagram describing the exemplary imaging engine of FIG. 1, which can be used to implement the present invention. This Figure illustrates the arrangement of certain electrical components of the imaging engine. The electronic hardware comprising the imaging subsystem and decoding subsystem is represented generally by a block 80 labeled control and logic circuit in FIG. 3. A double headed arrow 82 illustrates the conductance or transmission of signals between the image sensor 12 and the control and logic circuit 80. As shown in FIG. 3, the objective lens assembly 84, the aiming pattern generator 86 and the illumination source 88 may be controlled by signals provided by the control and logic circuitry 80. The following discussion focuses on certain functions performed by the control and logic circuitry 80; those interested in other aspects of this exemplary imaging device are referred to the above-incorporated by reference patent application.

Auto-Discrimination

Figure 4:
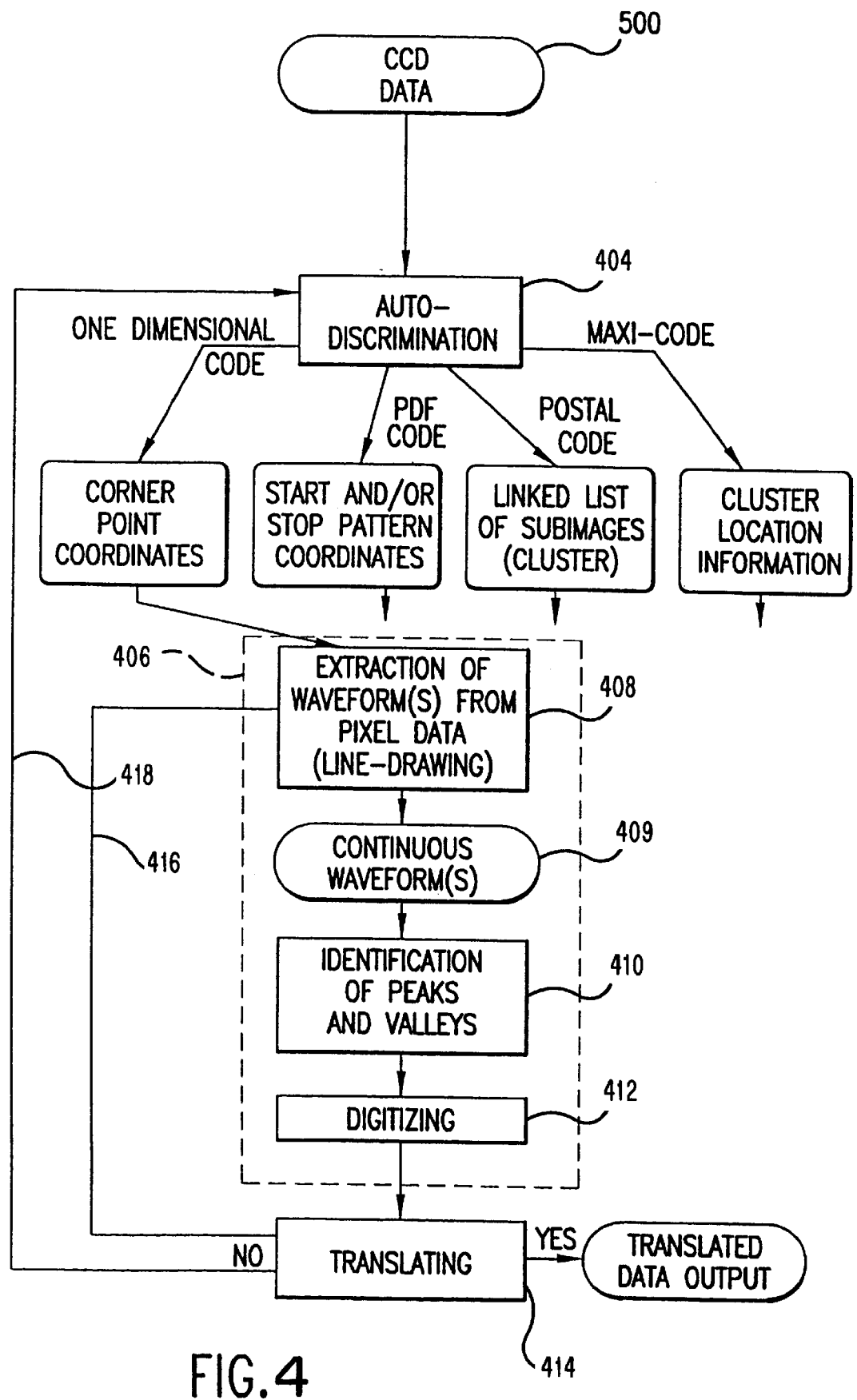
FIG. 4 is a flow diagram illustrating the auto-discrimination and decoding of CCD data in an exemplary embodiment of the present invention.
Figure 4A:
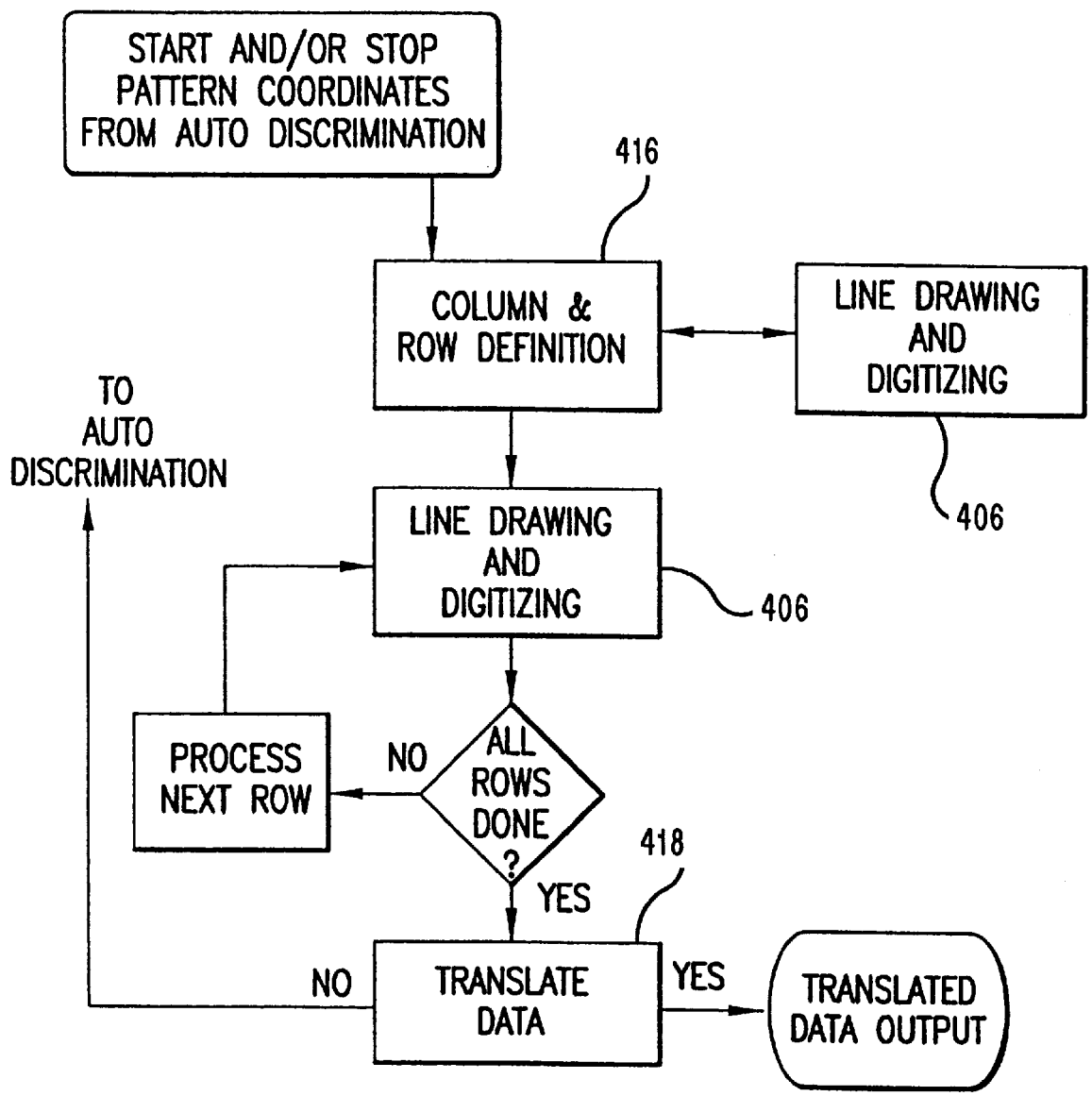
FIG. 4(a) is flowchart depicting the processing of PDF codes.
Figure 4B:
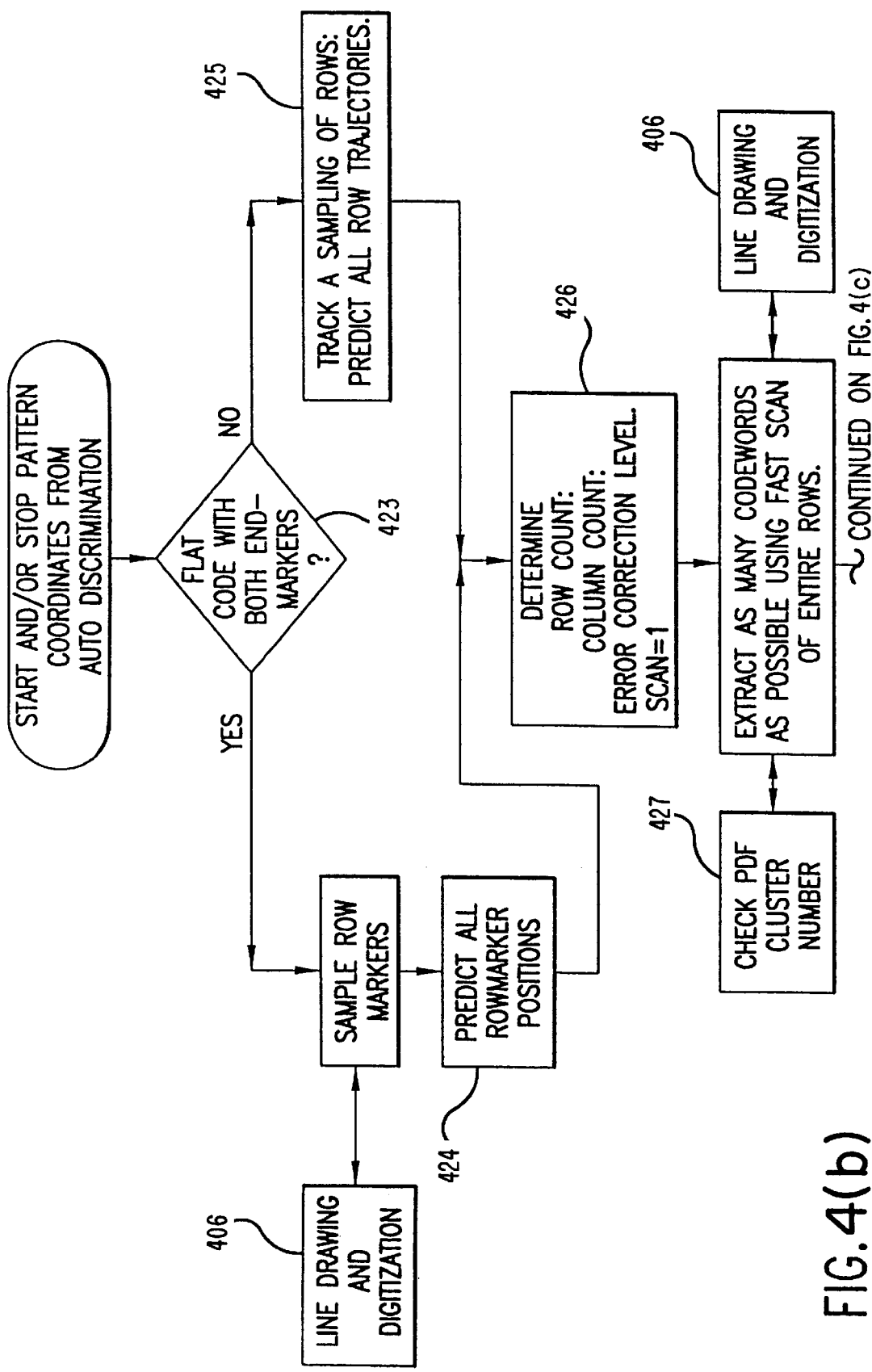
FIGS. 4(b) and 4(c) are another flowchart depicting the processing of PDF codes.
Figure 4C:
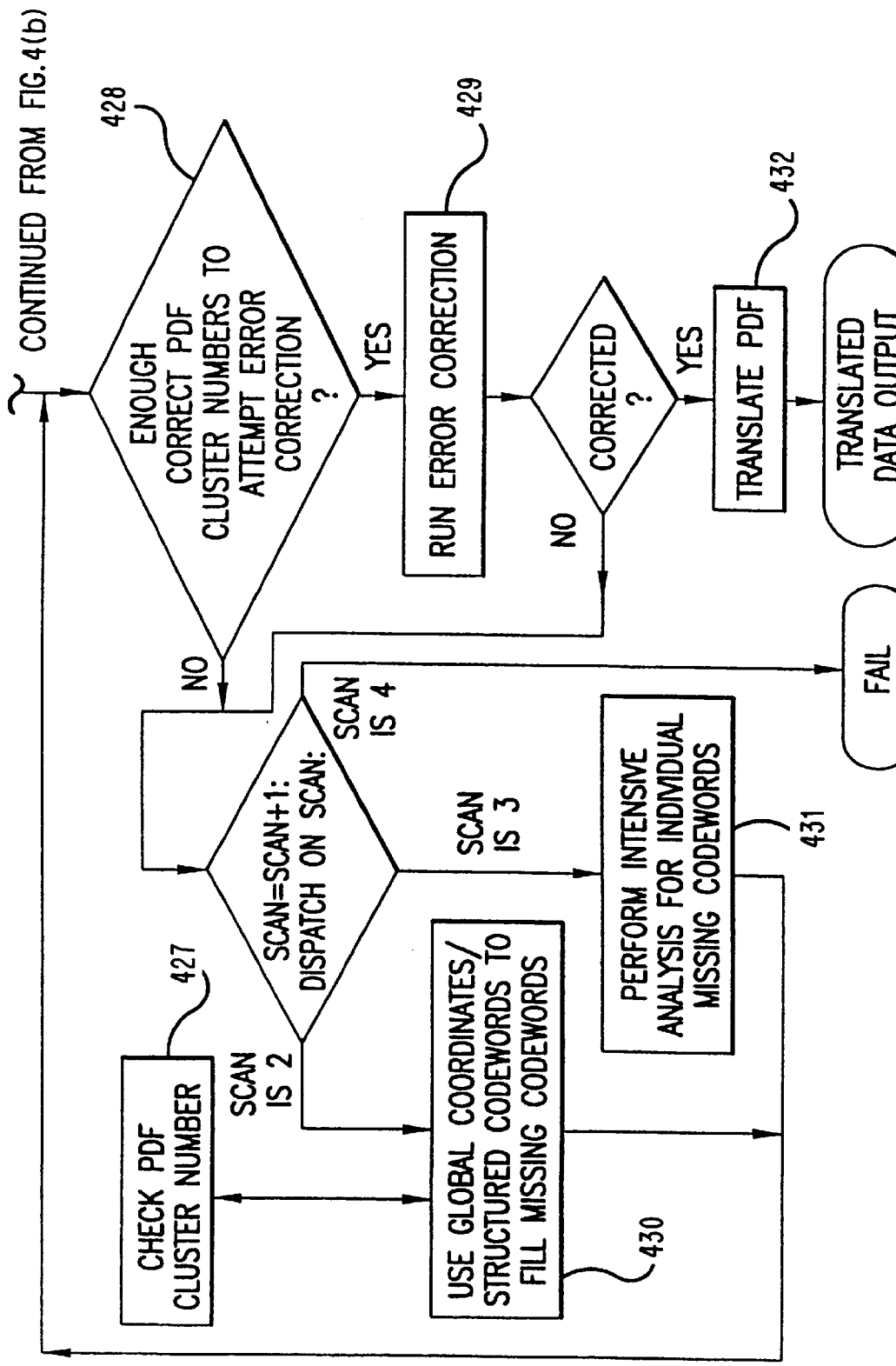

FIG. 4 is a high-level flow diagram illustrating the processing and decoding of CCD data according to an exemplary embodiment of the present invention. CCD data obtained by the image sensor circuitry is indicated at 400. This data may be in the form of, for example, 10 bit gray scale information stored in a memory device, e.g., a DRAM, and corresponding to a twodimensional array of pixel information for a target image. This data is preprocessed by circuitry/software based auto-discrimination function 404 prior to decoding. Unlike conventional omnicode readers, those developed in accordance with the present invention will first evaluate the pixel data provided by block 400 in a two dimensional manner in an effort to identify regions in which potential optical codes exist and to identify a type of optical code associated with each region, before attempting to decode information. The auto-discrimination function relies upon both statistical and non-statistical analysis of the image to achieve these objectives. By pre-processing the image data in this manner, faster overall decode times and greater operational robustness are achieved relative to the conventional "trial and error" methods described above.

More specifically, the auto-discrimination function 404 uses statistical analysis of parameters associated with the CCD data 400 to determine a likelihood that a region contains a particular type of optical code. For example, the auto-discrimination function 404 may evaluate the CCD data 400 associated with a particular user input and determine that it is 65% likely to contain a one-dimensional code and 25% likely to contain a two-dimensional PDF code. Non-statistical evaluations can be performed, e.g., evaluation of the boundary structure of an identified region, to increase the auto-discrimination function's confidence in a particular classification. Exemplary parameters and statistical analyses that can be performed by the auto-discrimination function 404 are described below.

Once the auto-discrimination function 404 has identified a region as most likely containing an optical code of a particular type, it will pass certain parameters to a subsequent processing function which is associated with that optical code type. This is illustrated in FIG. 4 by way of the various parameter passing blocks associated with one-dimensional codes, PDF codes, Postal codes and MaxiCode. Those skilled in the art will appreciate that the number of subsequent processing functions can vary depending upon how many code types the optical code reader is intended to be able to decode.

The parameters passed from the auto-discrimination function to the selected decode function may vary depending upon the type of code identified by the auto-discrimination function 404. For example, if the auto-discrimination function 404 identifies a particular region within the target area as most likely containing a one-dimensional bar code, then the auto-discrimination function 404 can pass the corner point coordinates (in absolute terms or as memory addresses) associated with the region containing the bar code. For PDF codes, the auto-discrimination function can pass coordinates of the stop and start patterns found in these codes. For postal codes, the auto-discrimination function 404 can pass a linked list of subimages in a cluster and endpoints of a clock track, i.e., a line which passes through each bar in the postal code, to the appropriate decode function. For MaxiCodes, a more complex handshaking may be used between the auto-discrimination function 404 and the appropriate decode function wherein the region of interest for evaluation by the decode function is identified iteratively by the auto-discrimination function one slice at a time. Given that the auto-discrimination function 404 will select an appropriate decode function and pass different data dependent upon that selection, it will be apparent to those skilled in the art that the auto-discrimination function 404 may continue to evaluate an optical code after statistical and non-statistical evaluation as to code type has been completed to acquire additional information to pass the desired parameters to the appropriate decode function.

As illustrated in FIG. 4, once the auto-discrimination has output the optical code type dependent parameters, subsequent processing steps are performed to complete decoding of the image data in a particular region. FIG. 4 illustrates, generally, the steps associated with decoding image data in a region that has been identified as most likely containing a one-dimensional code. Exemplary techniques for subsequent processing of PDF codes is described below with respect to FIGS. 4(*a*) and 4(*b*). The subsequent processing associated with Postal codes and MaxiCodes is not included here to avoid obscuring the present invention. However, readers interested in exemplary techniques for decoding these optical code types are referred to the corresponding portions of the above-incorporated U.S. Pat. Application to Correa et al.

Continuing with the subsequent processing of one-dimensional codes, cluster and orientation information including, for example, the coordinates of the corner points defining a parallelogram of pixel information identified as likely containing a one dimensional bar code is further processed by block 406 to produce a digitized version of the code. More particularly, the function at 408 extracts one or more waveforms from the data in image areas of interest. This processing involves analysis of pixels near lines selected by the system (line drawing), which process is described in detail below. The result of this process is a continuous waveform 409 produced from pixel gray scale information in a relatively "wide" line or swath of pixels drawn across the one dimensional code along its principal axis as determined preliminarily by the auto-discrimination function 404. Peaks and valleys in the waveforms are identified as indicated at 410. Digitizing converts this information to electronic signals corresponding to the data or bit content of the image as indicated at 412. Digitizer processing is described in U.S. Patent Application entitled "Digitizing Bar Code Symbol Data", filed on Jun. 12, 1998, in the name of Duanfeng He and Eugene Joseph, which is hereby incorporated by reference. The digitized output is then translated at 414 to provide a translated data output. The signal line at 416, indicates the possibility of calling for the extraction of data from a different line drawn across the same one dimensional data. A failure to decode any line drawn may be used to trigger additional auto discrimination in a further attempt to identify and locate a target code as indicated by line 418. For example, the auto-discrimination function 404 may decide to identify the region as containing a second most likely optical code type, e.g., PDF in the example given above, and pass the parameters needed for the subsequent processing functions to attempt to decode this CCD data as a PDF code.

FIG. 4(*a*) is a simplified flow chart illustrating the processing and decoding of two-dimensional pixel data identified by the auto-discrimination function 404 as most likely being a two dimensional code such as PDF. Column and row definition is performed at 416. In the course of this processing, the wide line drawing and digitization processing identified at 406 in FIG. 4 may be called up to process portions of the pixel data. Once the column and rows of the code are defined, data may be sequentially extracted from the full length of the code rows by the processing algorithms of block 406. When data has been extracted from the rows of interest, translation may be attempted as indicated at block 418. If translation is unsuccessful, process control may be returned to the auto-discrimination function to select another code type and/or cluster of subimage pixels for analysis.

FIG. 4(*b*) is a more detailed flow chart illustrating a preferred technique for processing and decoding PDF Code. Generally speaking, the illustrated processing applies successively more computationally intensive processing as difficulty in decoding degraded images is encountered. As before data indicative of a cluster of subimages potentially containing PDF Code are provided by the auto-discrimination function 404. This data may be start and/or stop pattern coordinates. At 423, a determination is made as to whether the subimage cluster is a flat code with both end markers. If it is, the PDF Code row markers are sampled, during which the processing calls the line drawing and digitization subroutine 406, discussed above. From this all row marker positions are predicted at 424.

If the code is not flat or lacks one or both end markers, a sampling of rows is tracked and row trajectories are predicted as indicated at 425. Conventional PDF decoding techniques trace straight lines across the rows in a PDF symbol. When the PDF image is distorted (tiled and/or twisted), a single straight line may cross too many rows to allow decoding. Accordingly, the processing of a preferred embodiment breaks this single line into local line segments which then enables independent decoding of code words. The entire PDF image may be examined to determine whether and to what extent this technique will be employed.

Processing converged at 426 from functions 424 and 425 in the determination of row count, column count and error correction level information embedded in the PDF row markers. The error correction level data may be used later to determine whether to run error correction and what type of error correction to attempt.

The line drawing and digitization subroutine 406 may again be used to extract as many code words as possible using fast scans of entire rows. PDF cluster member may be checked by calling the subroutine 427. If enough correct PDF cluster members are identified at 428, a determination may be made to perform error correction processing 429.

If not enough correct PDF cluster members are identified, the processing is incremented to scan =2. At scan =2, global coordinates and structured code words are used to fill missing code words. In conventional PDF decoding, decoders attempt to decode code words one by one in a scan line. If the decode effort fails in a code word, it may be difficult to resume decoding the next code word because of uncertainty of the location of the boundary of the next word. This problem when encountered could be obviated by decoding in a reverse direction along the row from a region of high confidence (e.g. a start/stop pattern). Alternatively, as indicated at 430 known positions of adjacent rows and code words can be used to predict the start of code words in a damaged row. The decoding can be verified by a call to check the PDF cluster members obtained.

If, after scan =2, the processing has still not identified image correct cluster member, the processing is incremented to scan =3. At scan =3, intensive analysis is performed to decode individual missing code words at 431. In preferred embodiments, good code words are mapped. As to areas containing bad code words, more complex two dimensional processing is applied in an attempt to extract the missing code words. If after this, not enough correct PDF cluster numbers are obtained, the scan marker is incremented to 4, indicating a decoding failure. In response to a decoding failure, process control may be retained to the auto-discrimination function 404 to redetermine code type or start/stop pattern coordinates. Alternatively, more processing time may be allocated to the decoding functions of FIG. 4(*b*). Further, alternatively, new image data may be acquired and processed by the auto-discrimination function. If error correction is successful, corrected data may be translated at 432.

Having provided an overview illustrating the concept of auto-discrimination according to the present invention, two detailed examples of auto-discrimination techniques will now be discussed in connection with FIGS. 5–9. In these embodiments, auto-discrimination is performed by examining characteristics associated with the pixel data obtained from the CCD, for example, local surface tangents associated with designated pixels.

Figure 6:
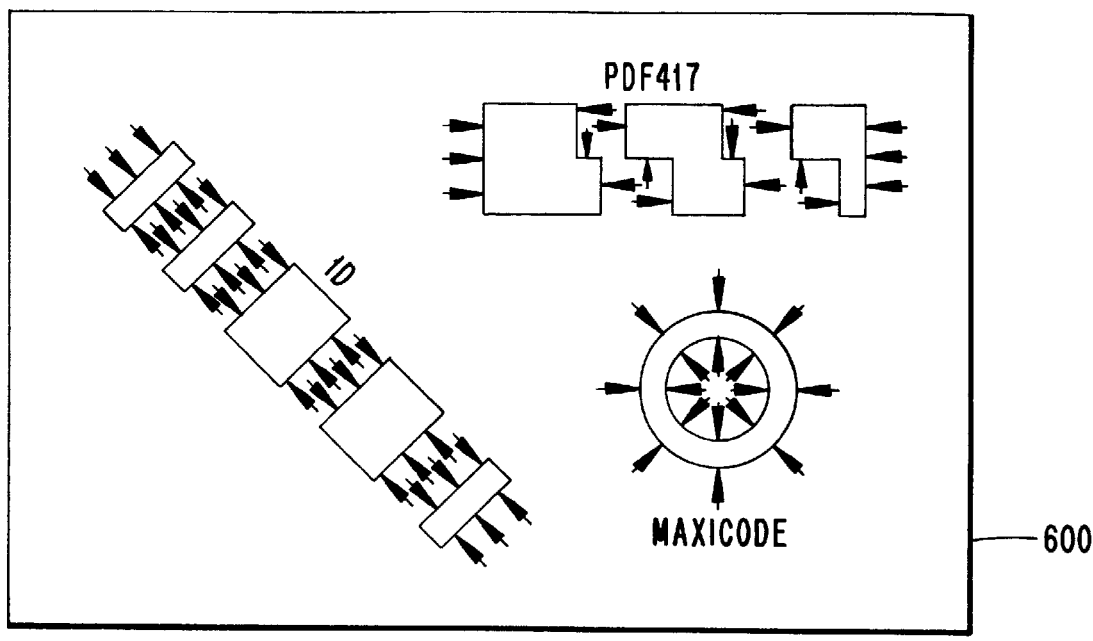
FIG. 6 conceptually portrays the information provided by surface tangents.
Figure 7:
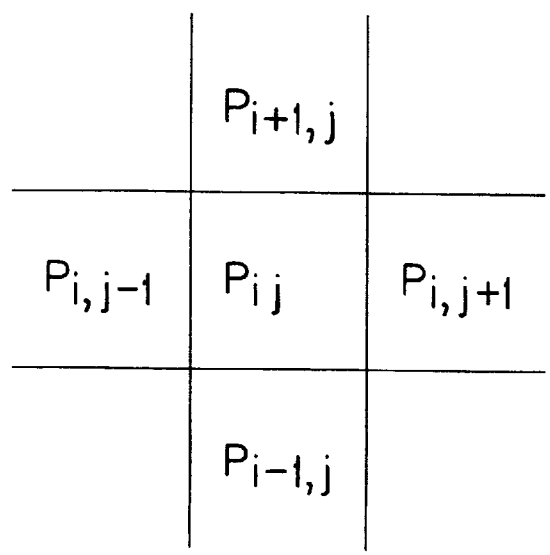
FIG. 7 depicts a block of pixels in conjunction with a description of surface tangent calculation.

Surface tangents provide information regarding contour orientation of code elements, as conceptually illustrated in FIG. 6. Therein, three different types of optical codes are disposed in target area 600. The arrows depict the surface tangent vectors for exemplary pixels at the boundaries of the code elements. This figure is useful in understanding the types of information conveyed by the surface tangent vectors, specifically the number of major orientations associated with each optical code, as well as the direction of each major orientation. Note that the one-dimensional code has one major orientation (considering a 180 degree spectrum), the PDF code has two major orientations and the MaxiCode has more than two major orientations. This information can be used by an exemplary auto-discrimination function to aid in classifying each code.

Referring back to the flow chart of FIG. 5, step 500 provides for the calculation of these surface tangent vectors. Surface tangents can, for example, be calculated for all pixels within the target area and stored in memory for further processing. Alternatively, a subset of pixels can be designated for surface tangent calculation to reduce the processing power required for this operation. For example, the pixels in every other column and every other row of the target area could be selected as the subset for surface tangent calculation.

This particular subset has been shown to provide good results in terms of noise immunity and accurate code element orientation, while using less processing power than would be required to process all pixels. Those skilled in the art will appreciate that the particular number of available pixels to be processed is subject to design considerations and that the present invention encompasses all such implementations.

The calculation of a surface tangent vector for each pixel can be performed as follows. Consider the pixel $p_{ij}$ illustrated in FIG. 7, which is stored in memory as a gray scale value. The surface tangent vector $t_{ij}$ can be calculated by first determining the x and y-axis component vectors:

$$x_{ij} = (p_{i,j+1} - p_{ij-1})x$$

$$y_{ij} = (p_{i-1,j} - p_{i+1,j})y$$

and then adding them together:

$$t_{ij} = x_{ij} + y_{ij}$$

Reviewing these equations, it will be seen that pixels surrounded by other pixels having substantially the same gray scale representation (e.g., pixels inside a dark code element or pixels associated with empty or blank space) will have a zero or near zero surface tangent vector. These vectors can be eliminated from consideration because they provide no information relating to code element orientation. The non-zero surface tangents, other than those which are associated with errors caused by specular anomalies, misprinting, reading errors, etc., will occur at the boundaries of code elements and provide information regarding the contours and orientation of the code elements which is used as described below.

Returning to the flow chart of FIG. 5, once the surface tangent vectors have been calculated for the designated pixels, the auto-discrimination function 404 can then perform statistical analysis on this data. First, the target area can be divided into a number of subimages at step 502. For example, the target area may be divided into 32×32 pixel subimages, although those skilled in the art will appreciate that the size of the subimages, relative to the size of the CCD array, may vary. The surface tangent vectors for each subimage are then statistically analyzed to provide generalizations about the types of code element(s), if any, associated with that subimage. As can be seen in FIG. 6, a one-dimensional code element will generate (primarily) surface tangents having two orientations that are 180 degrees opposed in orientation. Likewise, two-dimensional code elements will generate surface tangent vectors having four orientation directions, pairs of which are 180 degrees opposed. MaxiCodes, and their ilk, will generate surface tangent vectors having multiple different orientations.

Accordingly, it is desirable to determine, for each subimage, how many major orientations are associated with the surface tangents calculated for pixels within that subimage. To determine the number of major orientations, the each surface tangent vector associated with a subimage can be sorted into one of a plurality of different orientations, e.g., eight, over a 180 degree spectrum. Since there will be two, 180 degree opposed vector directions for each dimension of interest, each vector in the 180–360 degree range can be sorted into an appropriate one of the plurality of different orientations with the 0–180 degree spectrum by subtracting 180 degrees therefrom.

After each surface tangent vector of a subimage is grouped into one of the predetermined orientations, the number of vectors in each category can be counted to determine how many major orientations are associated with that subimage as part of subimage statistic gathering of step 504 in FIG. 5. The predetermined orientation having the largest number of surface tangents is deemed the major orientation for that subimage. If another predetermined orientation has more than some threshold percentage of the number of surface tangents as the major orientation, e.g., 25 or 30 percent, then that predetermined orientation may be identified as a minor or secondary orientation.

Once the statistics have been gathered for each subimage, these statistics can be further evaluated to identify potential optical codes by clustering subimages having similar statistics together. For example, the statistics of adjacent subimages can be compared to identify subimages with surface tangents having the same major orientation. These subimages are grouped together as illustrated conceptually in FIG. 8 to form clusters 800 and 802, as described in step 506 of FIG. 5. Clustering can be performed as a multi-pass process wherein the threshold level of similarity between subimages is varied from pass to pass. For example, a strong statistical similarity is typically found between subimages associated with one-dimensional code and PDF codes, whereas subimages associated with Postal codes may be less statistically similar. The auto-discrimination function 404 can also provide a preliminary identification of the optical code type at step 508 for each cluster based upon statistical information, e.g., the existence/absence of major and minor orientations, as well as non-statistical information, e. g., the existence of start and stop patterns associated with PDF codes, and can pass (step 510) the predetermined information associated with that code type to the appropriate decode function as discussed above with respect to FIG. 4.

Figure 8:
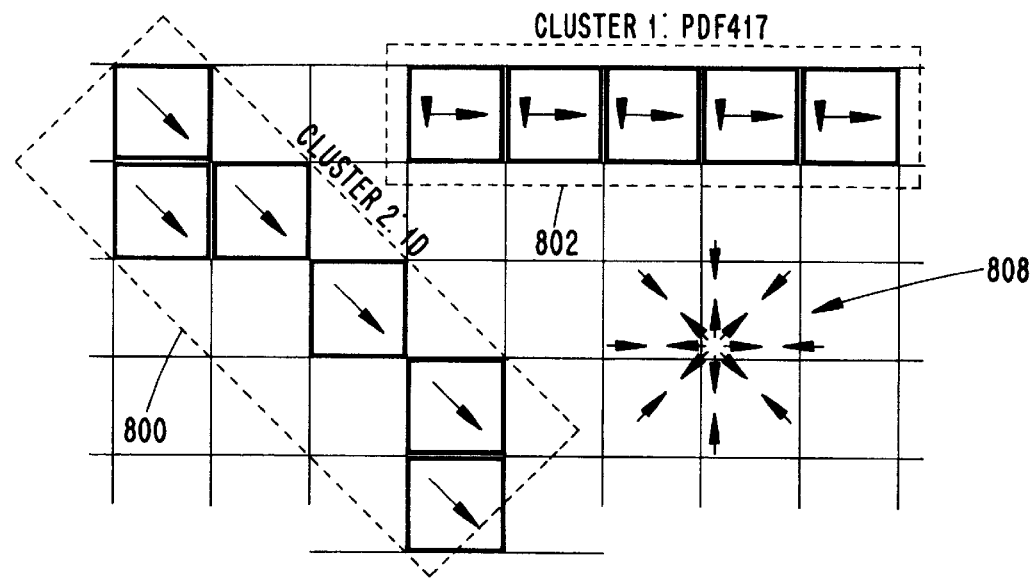
FIG. 8 shows clustering of subimages by the auto-discrimination function according to an exemplary embodiment of the present invention.

As will be apparent from the fact that the MaxiCode 808 in FIG. 8 has not been identified as a cluster, some types of optical codes may not generate sufficiently similar surface tangent statistics to be identified or clustered using only the techniques described above with respect to the exemplary embodiment of FIG. 5. For example, MaxiCodes will generate many different surface tangent orientations, which will result in adjacent subimages that may have different, rather than similar tangent statistics.

Accordingly, the auto-discrimination function 404 may also generate other types of statistics using the CCD data 400 in order to identify optical code types. For example, a black level, a white level and a threshold level can be calculated for each subimage by generating a histogram of the pixel intensities for some set of pixels in each subimage. As with the generation of surface tangents, the black level, white level and threshold level may be determined using all of the pixel values in each subimage or a subset of pixel values to reduce processing requirements. Applicants have discovered that codes, such as MaxiCodes, which may not result in clustered subimages based on comparison of surface tangent orientations, can be clustered and identified as to type when subimages are compared and clustered based on having similar black, white and threshold levels.

As mentioned earlier, the auto-discrimination function 404 may also perform certain pre-processing functions in order to provide additional information to the subsequent decoding function associated with the identified optical code type. One of these pre-processing functions involves determining the height of code elements by traversing the length of the code element which can provide, for example, information used to decode postal codes. This process involves evaluating pixels associated with a code element and comparing them to a gray level threshold to determine if the pixel is part of the code element. The technique moves from pixel to pixel along a direction or directions which are initially selected using the general knowledge of the optical code's orientation based, for example, on the major direction identified using the surface tangent information described above. As part of the traversing process, the auto-discrimination function 404 will identify code element edge points or pixels. Knowledge of the location of these edge points can be used to further refine the auto-discrimination function's estimate of the major orientation, e.g., to within less than 10 degrees. This relatively accurate major orientation information is passed to the subsequent processing to determine an ideal line for sampling pixel data as will now be described below.

Line Drawing

Once an optical code type is identified for a particular cluster, information is passed to the appropriate decoder, as shown in FIG. 4, to extract the data contained within the optical code. For many types of optical codes, the decoding process includes sampling the identified region in order to identify values associated with the optical code. Processing of one-dimensional bar codes, for example, involves sampling the optical code in a manner intended to determine the width of the bars and/or spaces in the code. The samples are converted to a gray scale waveform from which the desired dimensional information can be determined. Techniques for digitizing gray scale waveforms in order to obtain such information are described in the above-mentioned U.S. Patent Application, entitled "Digitizing Bar Code Symbol Data", filed on Jun. 12, 1998, incorporated here by reference. As mentioned earlier, conventional optical scanning devices which have a linear scanning path would, when aimed properly, directly sample the code along the direction of information.

However, an imaging device which captures information relating to a target area defined by the device's field of view must select which values from those stored in a two-dimensional array to include as part of the sample. The process of selecting the pixels to be used in the sample can be conceptualized as drawing a line across the region of interest and using the pixel values that fall on that line to identify values associated with the optical code. Of course, the CC D array does not return an infinite number of pixels describing the target area. Accordingly, unless the optical code is untilted relative to the vertical or horizontal lines of CCD elements, the ideal scanning line (i.e., a line along direction of information) will not fall neatly along a row of pixels.

Figure 9:
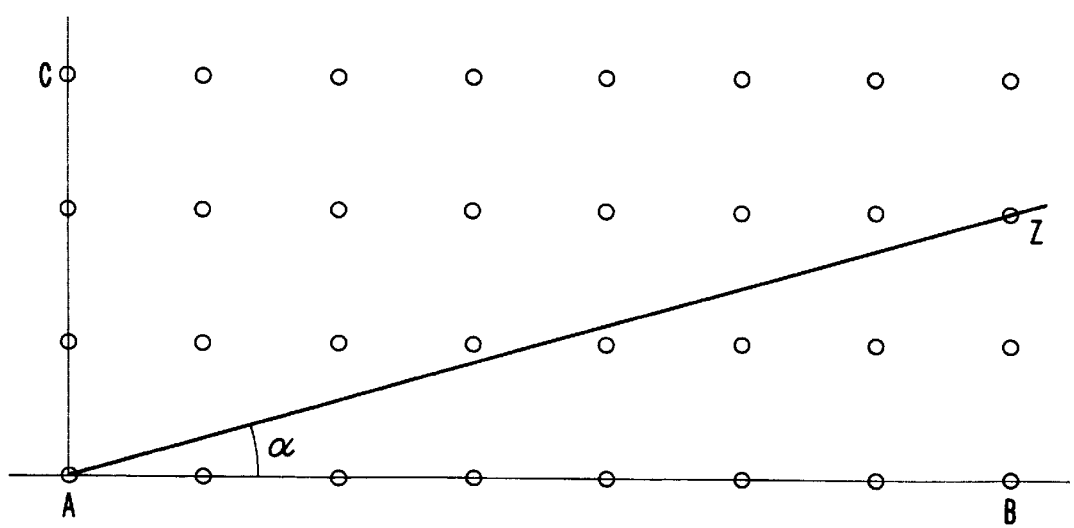
FIG. 9 depicts an ideal scanning path relative to available pixel information returned from a CCD array.

This concept is illustrated in FIG. 9. Consider a two-dimensional array of pixel values represented in the figure as circles that are stored in memory. If the ideal scanning line happens to be untilted relative to the horizontal (e.g., line AB) or vertical (e.g., line AC) axes associated with the array of CCD elements, then the sampling of the pixel data is straightforward. Otherwise, when the ideal scanning line has some tilt relative to the horizontal or vertical (e.g., line AZ having an angle a relative to the horizontal), then the line drawing technique must decide which pixels neighboring the line are selected as samples from which to create the waveform.

Figure 10:
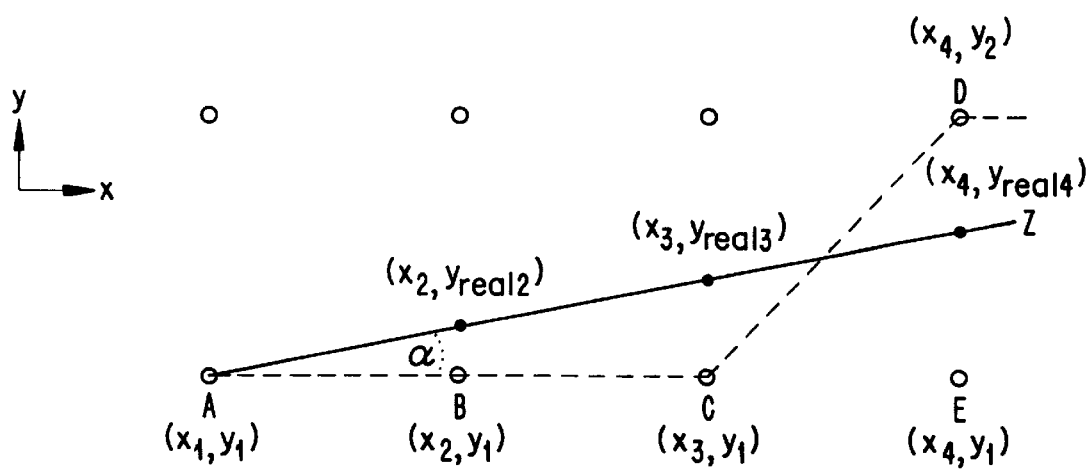
FIG. 10 illustrates line drawing according to one exemplary embodiment of the present invention.

One technique for sampling the gray scale values associated with neighboring pixels is referred to herein as the "thin" line approach and will now be discussed with the aid of FIG. 10. The technique used for selecting points with which to create the "thin" line is sometimes referred to as Bresenham's algorithm.

Consider that the line drawing function in a decoder receives an indication from the auto-discrimination function 404 that the ideal scanning path for a particular cluster is along the line AZ. Pixel data is indicated in the figure by open circles, while ideal sampling points along the line are denoted by filled circles. It can be seen that most of the ideal sampling points are not stored in memory.

Since the tilt angle a to the horizontal is relatively small, the line drawing technique iteratively increments along the x axis and evaluates which y-axis pixel to select as follows. First, the ideal y value for any given x is determined using the equation of line AZ. Then, the y value of the previously selected pixel is subtracted from the ideal y value. If the result is greater than half the size of a pixel, i.e., the distance between pixels D and E in FIG. 10, then y is incremented by one. Otherwise, y remains unchanged and the process is performed again. Using the (x,y) notation indicated in FIG. 10, this reduces to comparing $y_{real}$ values until $y_{real}-y_1$ is greater than half the distance between the pixel rows at which point a pixel in row $y_2$ is selected instead of $y$. In the example of FIG. 10, this occurs at $x_4$ such that pixel D is selected for sampling instead of pixel E. This results in a real scanning path along the dotted line of ABCD using the "thin" line sampling approach to provide samples used to generate the waveforms represented by block 409 of FIG. 4.

Figure 11:
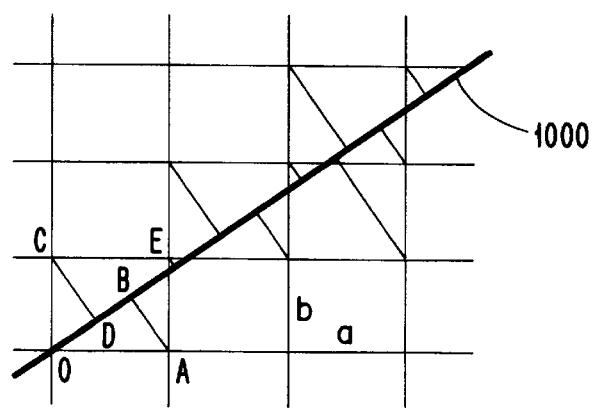
FIG. 11 illustrates sampling a two-dimensional grid of pixels to create a sample line having sub-pixel spacing between at least some samples.

Sampling one-dimensional information from a two-dimensional array offers the possibility for oversampling which is a valuable way to enhance an optical code reader's ability to accurately decode optical codes having small code elements. For some applications it will be desirable to obtain samples that are less than one pixel spacing apart. Consider the example illustrated in FIG. 11. Therein an ideal sampling line 1000, as identified by the major orientation information passed to the line drawing function 406 from the auto-discrimination function 404, is plotted on a grid wherein the grid points represent pixel information from the CCD array. The ideal sampling line passes through grid point 0, which provides one sample. Moreover, the gray scale information associated with pixel C can be projected as sample point D onto the ideal sample line 1000. Similarly, sample point B is created by projecting the gray scale value of pixel A onto the ideal sample line 1000. The ability of exemplary embodiments of the present invention to use these projections as samples is predicated, at least in part, on the relatively high accuracy, e.g., to within about 5 degrees, with which the line drawing function knows the direction of information so that the pixels can be accurately, i.e., perpendicularly, projected onto the ideal sample line 1000. This same characteristic permits exemplary embodiments of the present invention to readily track the projected distance of each sample, i.e., the distance from the beginning of the ideal sample line to the point projected thereon. Those skilled in the art will appreciate that this information is needed to calculate the abscissa values for generating the waveform. In the example of FIG. 11, it will be seen that the projected distance for pixel A, i.e., AB, is equal to OD and the projected distance for pixel C, i.e., CD, is equal to OB.

As seen in this figure, using the values of neighboring pixels as sample points provides more samples and the distance between sampling points along the ideal sample line 1000 becomes less than one pixel width. If the distance between samples becomes too small, e.g., on the order of ⅛ of the pixel width, then the sample values can be averaged together to form one sample to avoid inaccuracies associated with noise. Although this example illustrates the creation of samples by projecting the pixels closest to the sample line thereon, those skilled in the art will appreciate that pixels further away can also be used to create samples. In fact, Applicants expect to create sample lines that use data from pixels upto, for example four pixels away from the ideal sample line on either side, effectively creating a "thick" line of samples having a width of about 8–9 pixels.

Figure 12:
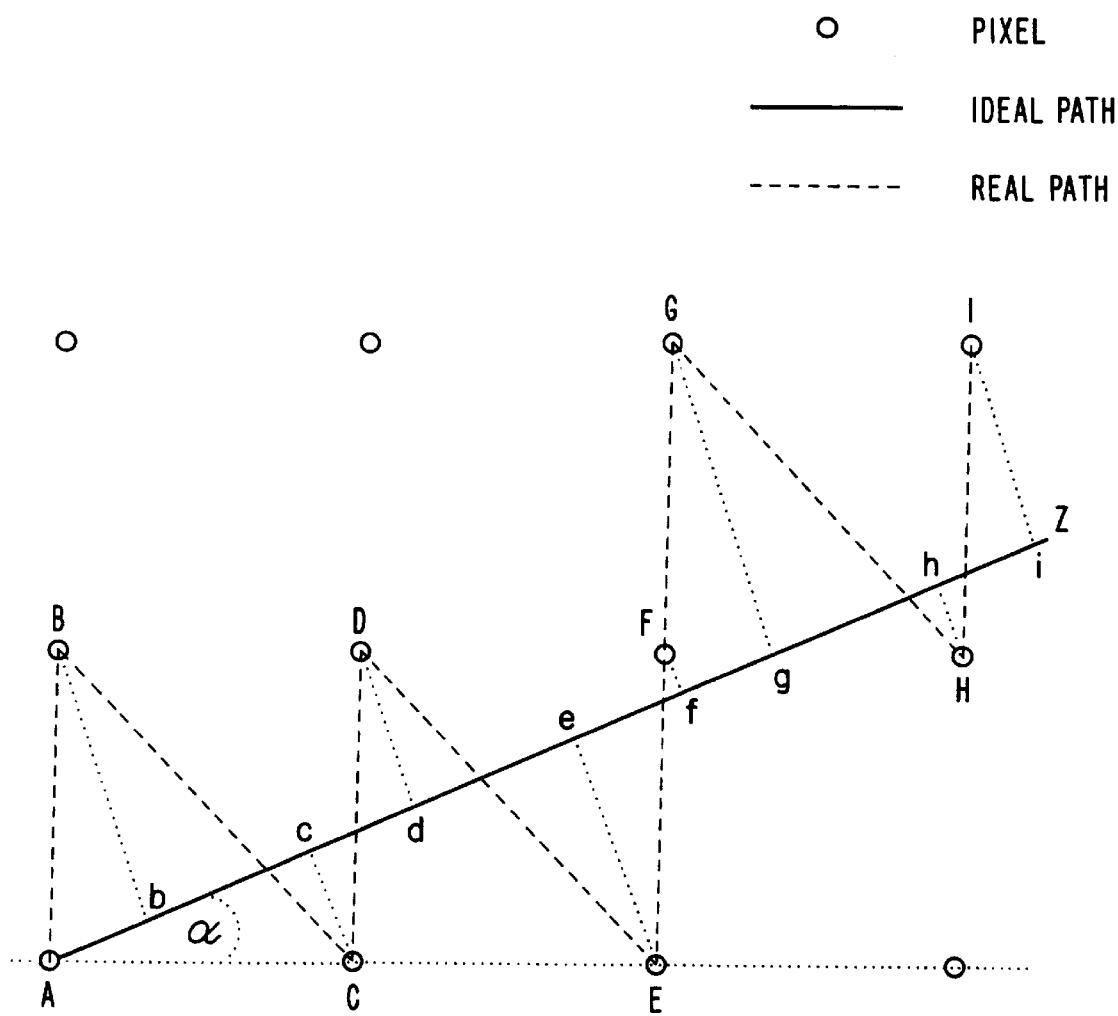
FIG. 12 illustrates line drawing according to another exemplary embodiment of the present invention.

An example of sampling using a "thick" line approach is illustrated in FIG. 12. As will be visually appreciated by comparing FIGS. 10 and 12, a greater percentage of the available pixels neighboring the ideal scanning line are selected as samples in FIG. 12 than in FIG. 10. This is accomplished according to the following algorithm. Note that in the following, the major direction is x if the tilt angle is measured from the horizontal and y if the tilt angle is measured from the vertical, thus the former in this example. The remaining direction is referred to as the minor direction.

From the starting pixel (A in FIG. 12) increment the pixel value by one in the minor direction, i.e., y in this example to select pixel B as the next sampling point. Maintain the previous y value of pixel A as the base y value for subsequent comparisons. Then, iterate as follows.

Determine $y_{real}$ assuming x=x+1, i.e., for the column including pixels C and D in FIG. 12. Then round $y_{real}$ up if the minor direction is down or, as in this example, round $y_{real}$ down if the minor direction is up. Compare the rounded $y_{real}$ to the base y value. If the rounded $y_{real}$ is the same as base y, then select the next pixel by taking one step in the major direction (x=x+1 in this example) and one step in the opposite of the minor direction (y=y−1 in this example) from the last selected pixel coordinates (B in this example). This results in selected pixel C after pixel B. If the rounded Yreal is not the same as the base y, then take one step in the minor direction (y=y+1) to select the next pixel (e.g., from pixel F to select pixel G) followed by one step in the major direction (x=x+1) and one step in the opposite minor direction (y=y−1) to select another pixel (e.g,. from pixel G to select pixel H). After selecting either one or two pixels for inclusion in the sample based upon the comparison between the rounded $y_{real}$ and the base y, the base y is reset to the y value of the last selected pixel and the process is repeated. Thus, pixel D is selected after pixel C and pixel I is selected after pixel H in the same manner that pixel B was selected after pixel A.

As the tilt angle approaches 45 degrees, the distance between some of the projected points, e.g., b and c in FIG. 12, may become much smaller than the distance between pixels. This can introduce significant noise into the sampling process. Accordingly, in such situations, it may be desirable to omit the selection of certain samples to avoid the introduction of noise. Alternatively, samples which are spaced closely together, e.g., on the order of ⅛th of a pixel, can have their corresponding gray scale values averaged and be taken as a single sample.

The "thin" and "thick" line approaches to sampling the data available from the CCD array are two examples of techniques for generating waveforms from which optical codes can be further decoded. Those skilled in the art will appreciate that the present invention encompasses other techniques, as well as hybrids of the "thin" and "thick" line approaches. For example, referring to the "thin" line drawing technique in FIG. 10, additional samples could be taken at significant points in the sampling process, e.g., where the real scanning line crosses the ideal scanning line wherein the value of pixel E can be projected onto the ideal scanning line and taken as an additional sample. This effectively means changing the "thickness" of the sampling line at selected areas to increase the accuracy and efficiency of the sampling algorithm.

Moreover, different line drawing techniques can be invoked depending upon the type of optical code and/or certain variable parameters, e.g., the tilt angle of the code. For example, as the tilt angle approaches 45 degrees, the equivalent sampling rate drops. Applicants have learned that when the tilt angle exceeds some threshold, e.g,. about 18 degrees, the equivalent sampling rate drops to such an extent that the "thin" line drawing technique described above with respect to FIG. 10 may not provide sufficient sampling data (i.e., resolution) to accurately decode certain optical codes, especially those with relatively few pixels per module (PPM). Accordingly, exemplary embodiments of the present invention provide for sampling optical codes having a tilt angle below a threshold using one line drawing technique (e.g., the "thin" line technique or the hybrid technique) and sampling optical codes above the threshold using a second, different line drawing technique (e.g., the "thick" line technique).

The described embodiments of the present invention are intended to be illustrative rather than restrictive, and are not intended to represent every embodiment of the present invention. Various modifications and variations can be made to the disclosed systems without departing from the spirit or scope of the invention as set forth in the following claims both literally and in equivalents recognized in law.

We claim:

1. A method for reading an optical code comprising the steps of:

obtaining pixel data;

calculating surface tangent vectors using said pixel data;

determining at least one major orientation of said optical code using said surface tangent vectors;

pre-processing said pixel data to identify an optical code type; and decoding said optical code using one of a plurality of optical code decoding techniques selected based upon said identified optical code type, wherein said at least one major orientation of said optical code is used in at least one of said pre-processing and decoding steps.

2. The method of claim 1, wherein said step of calculating surface tangent vectors is performed for all pixels in a target area.

3. The method of claim 1, wherein said step of calculating surface tangent vectors is performed for a subset of pixels in a target area.

4. The method of claim 1, wherein said step of determining at least one major orientation further comprises the steps of:

categorizing said surface tangent vectors into one of a plurality of directions; and identifying said at least one major orientation as a direction having a number of surface tangent vectors categorized therein which exceeds a predetermined threshold.

5. The method of claim 1, wherein said step of pre-processing further comprises the step of:

identifying said optical code type based on a number of said at least one major orientations.

6. The method of claim 5, wherein said step of identifying further comprises the step of:

identifying said optical code type as a one-dimensional code if said number of major orientations is one.

7. The method of claim 6, further comprising the step of:

identifying said one-dimensional code as a postal code if two code elements differ in a dimension perpendicular to said at least one major orientation, otherwise identifying said one-dimensional code as a bar code.

8. The method of claim 5, wherein said step of identifying further comprises the step of:

identifying said optical code type as a two-dimensional code if said number of major orientations is two; and identifying said optical code type as a multi-dimensional code if said number of major orientations exceeds two.

9. A method for decoding an optical code, comprising the steps of:

obtaining surface tangent information associated with at least one pixel in a target area;

identifying, based on said surface tangent information, an optical code type associated with an optical code disposed in said target area; and decoding said optical code in a manner selected based upon said optical code type.

10. The method of claim 9, where said step of obtaining pixel information further comprises the steps of:

obtaining said pixel information from an array of charge-coupled device elements; and storing gray scale data associated with each pixel in a memory device.

11. The method of claim 9, wherein said step of identifying said optical code type further comprises the step of:

determining a surface tangent vector associated with each of a plurality of said pixels; and storing said surface tangent vectors.

12. The method of claim 11, further comprising the steps of:

grouping said pixels associated with said target area into a plurality of subimages; and generating statistics for said stored surface tangent vectors associated with each subimage.

13. The method of claim 12, wherein said step of generating statistics comprises the step of:

correlating each surface tangent vector with one of a plurality of different orientations.

14. The method of claim 13, wherein eight different orientations are provided.

15. The method of claim 13, further comprising the step of:

determining a number of major orientations associated with each subimage by evaluating said tangent statistics.

16. The method of claim 15, further comprising the step of:

identifying said optical code type based upon said number of major orientations for at least one of said subimages.

17. The method of claim 9, wherein said step of identifying an optical code type further comprises the steps of:

determining a surface tangent for a plurality of said pixels;

dividing said target area into a plurality of subimages;

identifying at least one major orientation of surface tangents associated with each subimage;

grouping adjacent subimages having the same major orientation into a cluster; and identifying said optical code type in said cluster based upon at least one characteristic of said cluster.

18. The method of claim 17, wherein said at least one characteristic is a number of said major orientations of surface tangents.

19. A method for reading an optical code comprising the steps of:

obtaining pixel data;

dividing said pixel data into sub-images;

evaluating at least one statistic associated with each sub-image;

grouping together sub-images having similar statistics into a cluster; and processing pixel data associated with said cluster to read said optical code, wherein said at least one statistic is surface tangent vector orientation.

20. A method for reading an optical code comprising the steps of:

obtaining pixel data;

dividing said pixel data into sub-images;

evaluating at least one statistic associated with each sub-image;

grouping together sub-images having similar statistics into a cluster; and processing pixel data associated with said cluster to read said optical code, wherein said step of evaluating further comprises the steps of:

determining a plurality of surface tangent vectors for a sub-image;

correlating each surface tangent vector with one of a plurality of different orientations; and identifying one of said plurality of different orientations having a largest number of surface tangent vectors correlated therewith as a major orientation of said subimage.

21. The method of claim 20, wherein said step of grouping further comprises the step of:

grouping together neighboring sub-images having a same major orientation.

22. An optical code reader comprising:

an image sensor for producing signals corresponding to pixel information for a target image;

a memory device for storing said pixel information; and a processor for processing said stored pixel information to obtain a decoded value for an optical code, said processor first performing an auto-discrimination function to identify a type associated with said optical code based on surface tangent information associated with said stored pixel information and then performing a decoding function, selected based upon said identified type, to obtain said decoded value.

23. The optical code reader of claim 22, wherein said processor performs a statistical analysis on said stored pixel information to associate likelihoods with each of a plurality of optical code types.

24. The optical code reader of claim 23, wherein said processor subdivides said stored pixel information into subimages and performs said statistical analysis on each subimage.

25. The optical code reader of claim 24, wherein said statistical analysis includes determining a major orientation associated with surface tangent vectors for each subimage.

26. The optical code reader of claim 24, wherein said statistical analysis includes analysis of at least one of black level, white level and threshold level for each subimage.

27. The optical code reader of claim 24, wherein said processor groups together neighboring subimages having similar statistics.

28. The optical code reader of claim 24, wherein said processor further comprises:

a plurality of decoding functions downstream of said auto-discrimination, each associated with one of a plurality of optical code types;

wherein said auto-discrimination function passes coordinates of a group of subimages to one of said plurality of decoding functions associated with said identified type.

29. An optical code reader comprising:

an image sensor for producing signals corresponding to pixel information for a target image;

a memory device for storing said pixel information; and a processor for processing said stored pixel information to divide said target image into a plurality of subimages and to generate a value associated with each subimage, wherein said processor clusters those neighboring subimages having values which are within a predetermined threshold of one another and passes information to a subsequent decoding function which indicates which pixel information is included within a cluster.

30. The optical code reader of claim 29, wherein said processor generates said value by determining a plurality of surface tangent vectors associated with each subimage and identifying a major orientation having a greatest number of said vectors as said value, whereby neighboring subimages having the same major orientations form a cluster.

31. The optical code reader of claim 29, wherein said processor varies a value of said threshold from one clustering pass to a next clustering pass.

32. A method for sampling an optical code comprising the steps of:

estimating a tilt angle of said optical code relative to an axis associated with optical sensing elements;

using a first selection technique for sampling said optical code if said tilt angle is less than a predetermined angle; and using a seconds selection technique for sampling said optical code if said tilt angle is greater than said predetermined angle, wherein said step of estimating further comprises:

coarsely estimating said tilt angle by determining surface tangent vectors associated with pixels.

33. The method of claim 32, wherein said step of estimating further comprises:

refining an estimate of said tilt angle by evaluating code elements determine edge coordinates.

34. The method of claim 33, wherein said estimated tilt angle is accurate to within 10 degrees.

* * * * *